United States Patent Office 3,473,519
Patented Oct. 21, 1969

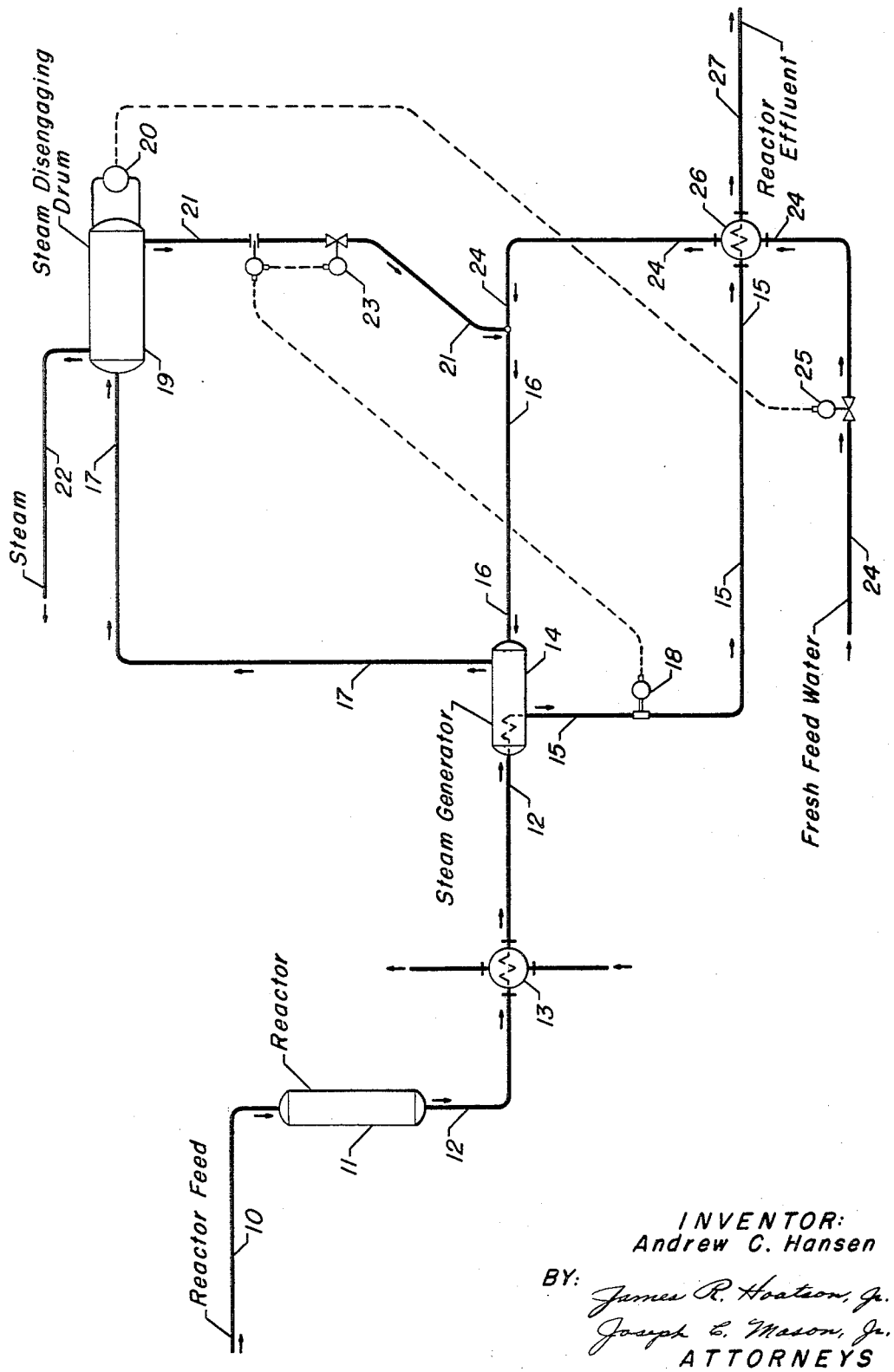

3,473,519
SYSTEM FOR STEAM GENERATION
Andrew C. Hansen, Palatine, Ill., assignor to Universal Oil Products Company, Des Plaines, Ill., a corporation of Delaware
Filed May 20, 1968, Ser. No. 730,250
Int. Cl. F22b 1/02
U.S. Cl. 122—32                    5 Claims

ABSTRACT OF THE DISCLOSURE

System for quenching a reaction zone effluent by indirect heat exchange steam generation. The invention broadly includes a method for steam generation utilizing controlled mixing of recycle steam condensate and fresh boiler feed water.

Background of the invention

This invention relates to a method for steam generation. It particularly relates to a system and method for quenching a reaction zone effluent by the indirect heat exchange steam generation technique. It specifically relates to a control system for regulating the temperature of a reaction zone effluent.

The prior art petroleum and chemical industries utilize, to a considerable extent, chemical reactions for the conversion of raw materials into more valuable products. Frequently, these chemical reactions require an elevated temperature in order for effective reaction to take place. Still more frequently, the elevated reaction temperatures are considerably higher in temperature than that required for conventional product separation techniques, such as absorption and/or distillation. Many of the chemical reactions are also effectuated using catalysts and in many cases the chemical reaction will continue even outside of the reaction zone unless and until the reaction zone effluent is quenched to a temperature below which further reaction will not take place.

Therefore, the prior art has utilized various chemical engineering schemes for cooling and/or quenching hot materials, such as the effluent from a chemical conversion zone. These methods have included, among other ways, indirect heat exchange with incoming feed and/or separated products; steam generation; direct quenching with cooled products; etc. However, each of these prior art schemes have various disadvantages, but are directed to one basic engineering problem, to wit: the transfer of heat. Steam generation has been used frequently since the latent heat of vaporization of water consumes considerably more B.t.u.'s of heat than generally the sensible heat consumption by the indirect heat exchange expedient of heating, for example, an incoming feed stream with the liquid effluent from a reaction zone.

Accordingly, it would be desirable to provide a system and method for improving the prior art schemes of steam generation and/or reaction zone effluent quenching.

Summary of the invention

It is, therefore, object of the present invention to provide a method for steam generation in an improved, facile manner.

It is another object of this invention to provide a system for quenching and/or cooling the effluent from a conversion zone.

Thus, the present invention provides an improved system for quenching a reaction zone effluent by indirect heat exchange steam generation which comprises, in combination: (a) steam generator having first inlet means for hot reactor effluent, first outlet means for cooled reactor effluent, second inlet means for water, and second outlet means for steam; (b) temperature measurement means in said first outlet means; (c) steam disengaging drum in open communication with said steam generator via said second outlet means and having liquid level means associated therewith; (d) liquid outlet means from said steam drum containing flow control means operatively connected to said temperature measurement means and openly connected to said second inlet means; (e) third liquid inlet means connected to said second inlet means; and, (f) flow control means in said third inlet means operatively responsive to said liquid level means.

Another embodiment of the improved system includes the system hereinabove further characterized by indirect heat exchange means between liquid in said third liquid inlet means and liquid in said first outlet means.

One of the chemical conversion processes to which the present inventive system and method has unique application includes the prior art chemical reaction of hydrodealkylation. In recent years, the use of aromatic hydrocarbons, such as benzene, has greatly increased. For example, benzene of high grade purity is used as an intermediate in the preparation of styrene monomer which may be polymerized to form a type of rubber. Also, benzene is used as an intermediate in the preparation of phenol, aniline, maleic anhydride, insecticides, such as DDT and benzene hexachloride, and as intermediates in the preparation of synthetic fibers, such as some types of nylon.

The dealkylation of alkylaromatic hydrocarbons, such as toluene, to produce benzene is generally well known in the prior art and may be performed either thermally or catalytically. For the illustrative embodiment of this invention, toluene in high purity is utilized as the feedstock to a catalytic conversion zone which operates under conditions sufficient to produce benzene therefrom. The toluene may be obtained from a conventional catalytic reforming operation or as a by-product from the coke oven operation.

The dealkylation reaction conditions and the art of dealkylation are well known to those skilled in the art and need not be presented with great detail herein. However, suitable dealkylation conditions for the production of benzene from toluene utilizes a well known catalytic composite, such as a catalyst comprising a soluble salt of a metal of Group IV of the Periodic Table supported on an alumina base and also includes a temperature from 1000° F. to 1500° F., a pressure from 300 p.s.i.g. to 1000 p.s.i.g., and desirably, a molar excess of hydrogen in order to reduce the possibility of catalyst deactivation due to deposition of coke or other heavy carbonaceous material upon the catalytically active centers and surfaces of the catalyst. The liquid hourly space velocity through the catalyst bed may range from 0.5 to 5 and the hydrogen to hydrocarbon mol ratio may range from 3:1 to 15:1.

Even though the present invention will be described for illustrative purposes, as quenching a reaction zone effluent from the hydrodealkylation of toluene to benzene, it will be evident that the steam generation method and system of the present invention will be broadly applicable to any environment utilizing a hot heat transfer liquid as the heat supplying media for the generation of steam from boiler feed water.

The invention may be more fully understood with reference to the appended drawing which is a schematic representation of apparatus for practicing one embodiment of the present invention.

Description of the drawing

It is understood that the drawing as well as the description thereof is presented herein for the sole purpose of illustration and is not intended to limit the system and method of the present invention beyond the scope of the appended claims. In the interest of simplicity, various heat exchangers, condensers, valves, pumps, control instruments, etc. have been eliminated from the drawing leaving only those vessels, connecting lines, heat exchangers, control instrumentation, and the like, which are necessary for a complete understanding of the method and system.

Referring now to the drawing, a toluene stream obtained from a coke oven operation or from a catalytic reforming operation is introduced into the system via line 10 and passed into reactor 11 containing a catalytic composite of the type referred to above. Suitable reaction conditions are maintained in reactor 11 to effectuate the substantial conversion of toluene to benzene.

The effluent from reactor 11 is withdrawn at an elevated temperature via line 12, passed through heat exchanger 13 for a reduction in temperature of the effluent and then into steam generator 14 which is of the conventional type, such as a tubular-kettle exchanger.

The cooled reactor effluent is withdrawn from generator 14 via line 15 and its temperature determined by thermometer means 18 which also generates a first signal representative of the temperature level of the effluent in line 15. Following the temperature measurement, the material continues in line 15 into heat exchanger 26 which provides, desirably, preheat to fresh boiler feed water which is entering the system via line 24. The quenched and cooled reactor effluent leaves the system via line 27 for the recovery therefrom of conversion products, such as benzene, by conventional means not shown, such as absorption and/or distillation means.

Returning now to steam generator 14, water from a source hereinafter more fully discussed enters generator 14 via line 16 and is converted into steam under the conditions maintained in generator 14.

Generated steam containing entrained water is withdrawn from generator 14 via line 17 and passed into steam disengaging drum 19. Drum 19 is maintained under conditions for separating entrained water from the steam in a manner sufficient to produce substantially water-free steam which is withdrawn from drum 19 via line 22. A liquid water level is maintained in drum 19 which level is continually measured by level sensing device 20 which may be of the conventional side gage type or fluid type or any other type known to those skilled in the art for determining a liquid interface in a vessel, such as a steam disengaging drum.

The collected water in drum 19 is withdrawn via line 20 through orifice control means 23 and passed from control means 23 into line 16 for return to steam generator 14.

One critical feature of the present invention includes the activation of flow control means 23 by the signal generated from temperature sensing device 18.

The incoming fresh boiler feed water which enters the system via line 24 passes through flow control means 25 which may be of the same orifice-control valve type as 23 and passes into heat exchanger 26 in the manner previously described. The preheated fresh boiler feed water is then introduced also into line 16, preferably, by admixture with the returning steam condensate from line 21.

It is another critical feature of this invention that the rate of fresh boiler feed water entering the system be controlled by a signal generated from level control device 20 in drum 19, previously discussed.

In short, therefore, the system and method of the present invention provides a means for controlling the effluent temperature from a conversion zone by carefully regulating the steam generation cycle associated with the quenching or cooling mechanism of the effluent. The principle upon which the present invention operates is predicated on the concept that more heat can be removed from the effluent via the latent heat of vaporization of the water than can be removed by increasing the sensible heat of the water from its incoming temperature to its boiling point temperature. It is to be noted that the returning steam condensate in line 21 is hot water and its temperature is carefully controlled by the mixing technique of demand flow for the fresh feed water entering the system. Optionally, heat exchanger 26 provides additional preheat to the fresh boiler feed water so that steam generator 14 can remove more quickly the latent heat of vaporization rather than taking time to consume sensible heat.

Preferred embodiment

Therefore, from the embodiments presented and the illustration offered with reference to the appended drawing, the preferred embodiment of the present invention includes an improved method for generating steam which comprises: (a) introducing hot heat transfer liquid into indirect heat exchange with hereinafter specified water in a steam generator maintained under conditions sufficient to convert said water into steam; (b) withdrawing cooled heat exchange liquid from said steam generator and determining the temperature thereof after said withdrawal; (c) generating a first signal representative of said determined temeprature; (d) withdrawing generated steam containing liquid water from said steam generator and passing same into a separation zone maintained under conditions to separate the withdrawn steam fraction into a liquid water phase and a gaseous steam phase; (e) determining the liquid phase level in said separation zone and generating a second signal representative of said determined level; (f) returning the separated water from said separation zone to said steam generation zone at a controlled rate responsive to said first signal sufficient to maintain said temperature at a predetermined value; and, (g) introducing fresh water into admixture with said returning water from step (f) at a controlled rate responsive to said second signal.

A particularly preferred embodiment of the present invention includes the method hereinabove wherein said fresh water is preheated by indirect heat exchange with said cooled heat exchange fluid prior to said admixing thereof as specified in step (g).

The invention claimed:

1. System for quenching a reaction zone effluent by indirect heat exchange steam generation which comprises, in combination:
 (a) steam generator having first inlet means for hot reactor effluent, first outlet means for cooled reactor effluent, second inlet means for water, and second outlet means for steam;
 (b) temperature measurement means in said first outlet means;
 (c) steam disengaging drum in open communication with said steam generator via said second outlet means, and having liquid level means associated therewith;
 (d) liquid outlet means from said steam drum containing flow control means operatively connected to said temperature measurement means, and openly connected to said second inlet means;
 (e) third liquid inlet means connected to said second inlet means; and,
 (f) flow control means in said third inlet means operatively responsive to said liquid level means.

2. System according to claim 1 further characterized by indirect heat exchange means between liquid in said third liquid inlet means and liquid in said first outlet means.

3. Method for generating steam which comprises:
 (a) introducing hot heat transfer liquid into indirect heat exchange with hereinafter specified water in a steam generator maintained under conditions sufficient to convert said water into steam;
 (b) withdrawing cooled heat exchange liquid from said steam generator and determining the temperature thereof after said withdrawal;
 (c) generating a first signal representative of said determined temperature;
 (d) withdrawing generated steam containing liquid water from said steam generator and passing same into a separation zone maintained under conditions to separate the withdrawn steam fraction into a liquid water phase and a gaseous steam phase;

(e) determining the liquid phase level in said separation zone and generating a second signal representative of said determined level;

(f) returning the separated water from said separation zone to said steam generation zone at a controlled rate responsive to said first signal sufficient to maintain said temperature at a predetermined value; and (g) introducing fresh water into admixture with said returning water from step (f) at a controlled rate responsive to said second signal.

4. Method according to claim 3 wherein said fresh water is preheated by indirect heat exchange with said cooled heat exchange fluid prior to said admixing thereof as specified in step (g).

5. Method according to claim 3 wherein said hot heat transfer fluid comprises the effluent from a toluene hydrodealkylation reaction zone.

References Cited

UNITED STATES PATENTS

| | | | |
|---|---|---|---|
| 3,187,038 | 6/1965 | Hundley | 260—524 |
| 3,255,084 | 6/1966 | Doroszlai | 165—39 XR |
| 3,297,412 | 1/1967 | Phillips et al. | 165—39 XR |

KENNETH W. SPRAGUE, Primary Examiner

U.S. Cl. X.R.

165—39